United States Patent
Dauhiala et al.

(10) Patent No.: US 12,260,177 B2
(45) Date of Patent: Mar. 25, 2025

(54) GENERATION OF JURISDICTIONS LISTS FOR INPUT TEXT

(71) Applicant: Vertex, Inc., King of Prussia, PA (US)

(72) Inventors: Lizaveta Dauhiala, Minsk (BY); Andrei Kulchyk, Poznań (PL)

(73) Assignee: VERTEX, INC., King of Prussia, PA (US)

( * ) Notice: Subject to any disclaimer, the term of this patent is extended or adjusted under 35 U.S.C. 154(b) by 349 days.

(21) Appl. No.: 18/054,510

(22) Filed: Nov. 10, 2022

(65) Prior Publication Data

US 2024/0160845 A1 May 16, 2024

(51) Int. Cl.
*G06F 40/284* (2020.01)
*G06F 40/205* (2020.01)
*G06F 40/295* (2020.01)
*G06Q 40/10* (2023.01)

(52) U.S. Cl.
CPC .......... *G06F 40/295* (2020.01); *G06F 40/205* (2020.01); *G06F 40/284* (2020.01); *G06Q 40/10* (2013.01)

(58) Field of Classification Search
CPC ...... G06F 40/295; G06F 40/284; G06Q 40/10
USPC ............................................................ 704/9
See application file for complete search history.

(56) References Cited

U.S. PATENT DOCUMENTS

| | | | | |
|---|---|---|---|---|
| 11,676,231 | B1* | 6/2023 | Crouse | G06F 16/906 |
| | | | | 707/723 |
| 11,915,123 | B2* | 2/2024 | Dang | G06F 40/30 |
| 2019/0354544 | A1* | 11/2019 | Hertz | G06N 5/025 |
| 2023/0110941 | A1* | 4/2023 | Makhija | G06F 40/284 |
| | | | | 709/224 |
| 2024/0248963 | A1* | 7/2024 | Parham | G06F 18/2415 |
| 2024/0370668 | A1* | 11/2024 | Jiang | G06F 40/58 |

OTHER PUBLICATIONS

S. Shaghaghian, L. Y. Feng, B. Jafarpour and N. Pogrebnyakov, "Customizing Contextualized Language Models for Legal Document Reviews," 2020 IEEE International Conference on Big Data (Big Data), Atlanta, GA, USA, 2020, pp. 2139-2148, doi: 10.1109/BigData50022.2020.9378201. keywords: {Adaptation models (Year: 2020).*

* cited by examiner

*Primary Examiner* — Bharatkumar S Shah
(74) *Attorney, Agent, or Firm* — Alleman Hall & Tuttle LLP

(57) ABSTRACT

Systems and methods are provided that include a processor executing a program to receive input text, divide the input text into sentences, identify one or a plurality of jurisdiction candidates in the sentences from a predetermined taxonomy to generate a jurisdictions list, transform the jurisdictions list using a type recognition neural network to disambiguate jurisdictions in the jurisdictions list, the type recognition neural network being trained on a labeled ground truth dataset containing pairs of geographic names and tax jurisdiction types, and generate and output the jurisdictions list as a jurisdiction prediction list.

20 Claims, 5 Drawing Sheets

GENERATION OF JURISDICTIONS LISTS FOR INPUT TEXT

BACKGROUND

One of the classic problems in Natural Language Processing (NLP) is named entity recognition, or recognizing named entities in a given text sequence. These named entities may be organizations (companies, agencies, institutions) or geopolitical entities (e.g., countries, cities, or states), for example. The key to recognizing named entities is to learn the effective representations of entities. In conventional methods, each entity is assigned a fixed embedding vector that stores information regarding the entity in a knowledge base. Though these methods are capable of many different entity-related tasks, the quality of the entity-related tasks is insufficient for some applications, such as tax-related applications. One reason for this is that incorrect name entity recognition frequently occurs when handling jurisdiction names for tax-related jurisdictions. As one particular example, tax researchers may be interested in recognizing names of tax jurisdictions, and many tax jurisdictions may have similar names and be confused with one another. As one confusing example, there are many instances of cities and counties that have same names within the same state. In addition, jurisdiction names coinciding with common first and last names (example: James City County, Virginia) or frequently used words (example: Price City, Utah) may be misidentified by conventional methods. Fine-grained jurisdictions other than cities and counties may also be hard to recognize with such conventional methods.

SUMMARY

In view of the above, a computing system is provided, comprising a processor and memory of a computing device, the processor being configured to execute a program using portions of memory to receive input text, divide the input text into sentences, identify one or a plurality of jurisdiction candidates in the sentences from a predetermined taxonomy to generate a jurisdictions list, transform the jurisdictions list using a type recognition neural network to disambiguate jurisdictions in the jurisdictions list, the type recognition neural network being trained on a labeled ground truth dataset containing pairs of geographic names and tax jurisdiction types, and generate and output the jurisdictions list as a jurisdiction prediction list.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
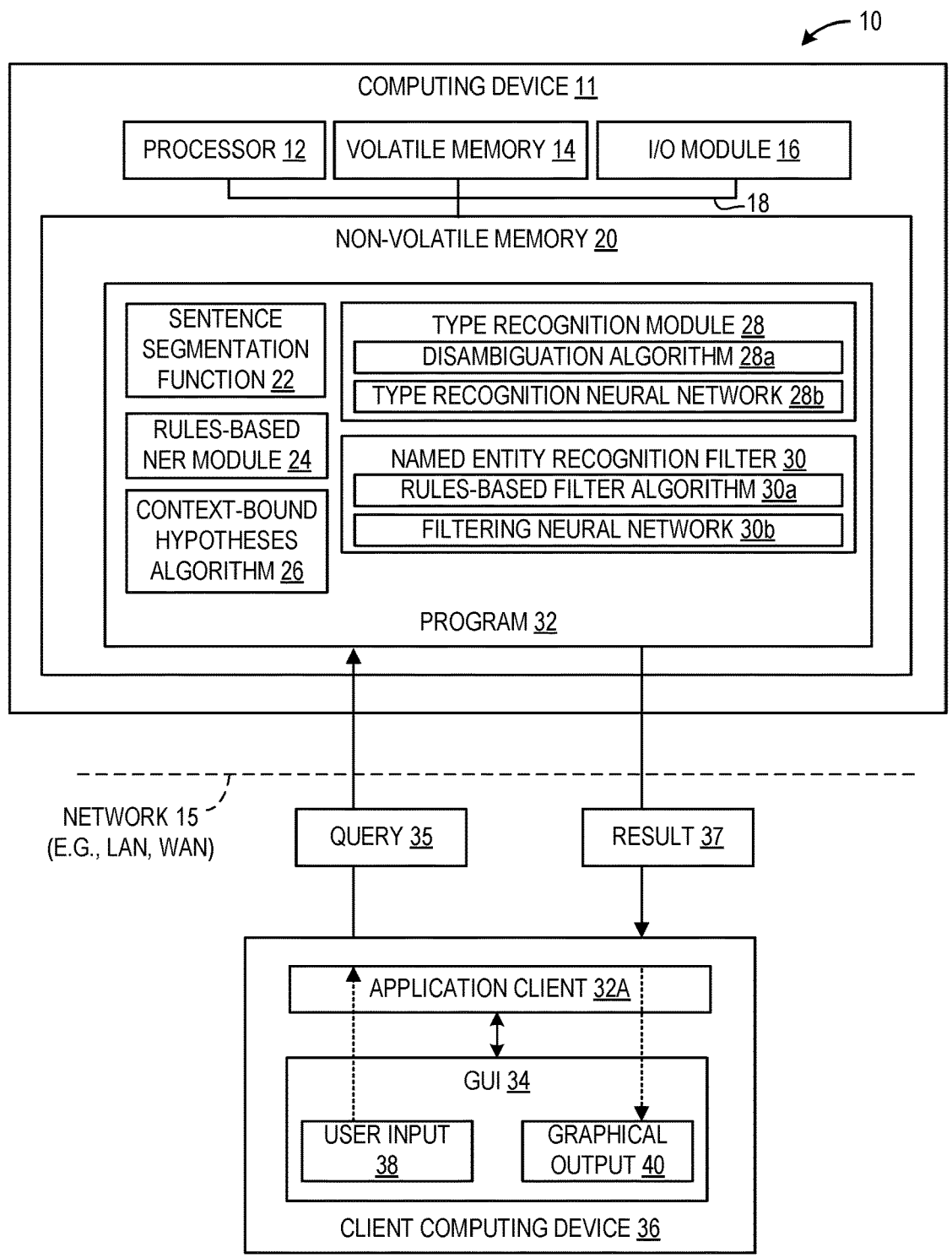
FIG. 1 illustrates a schematic view of a computing system according to an example of the present disclosure.

Referring to FIG. 1, a system 10 is provided, comprising a computing device 11 comprising a processor 12, an input/output module 16, volatile memory 14, and non-volatile memory 20 storing a program 32 comprising a sentence segmentation function 22, a rules-based named entity recognition module 24, a context-bound hypotheses algorithm 26, a type recognition module 28 including a disambiguation algorithm 28a and a type recognition neural network 28b, and a named entity recognition filter 30 including a rules-based filter algorithm 30a and a named entity recognition neural network 30b. A bus 18 may operatively couple the processor 12, the input/output module 16, and the volatile memory 14 to the non-volatile memory 20. Although the program 32 is depicted as hosted at one computing device 11, it will be appreciated that the program 32 may alternatively be hosted across a plurality of computing devices to which the computing device 11 is communicatively coupled via a network 15, including a client computing device 36 operatively coupled to the maintenance computing device 11. In some examples, the network 15 may take the form of a local area network (LAN), wide area network (WAN), wired network, wireless network, personal area network, or a combination thereof, and can include the Internet.

The system 10 comprises a processor 12 configured to store the program 32 in non-volatile memory 20 that retains instructions stored data even in the absence of externally applied power, such as FLASH memory, a hard disk, read only memory (ROM), electrically erasable programmable memory (EEPROM), etc. The instructions include one or more programs, including program 32, and data used by such programs sufficient to perform the operations described herein. In response to execution by the processor 12, the instructions cause the processor 12 to execute the program 32 including the sentence segmentation function 22, the rules-based named entity recognition module 24, the context-bound hypotheses algorithm 26, the type recognition module 28 including the disambiguation algorithm 28a and the type recognition neural network 28b, and the named entity recognition filter 30 including the rules-based filter algorithm 30a and the named entity recognition neural network 30b.

The processor 12 is a microprocessor that includes one or more of a central processing unit (CPU), a graphical processing unit (GPU), an application specific integrated circuit (ASIC), a system on chip (SOC), a field-programmable gate array (FPGA), a logic circuit, or other suitable type of microprocessor configured to perform the functions recited herein. The system 10 further includes volatile memory 14 such as random access memory (RAM), static random access memory (SRAM), dynamic random access memory (DRAM), etc., which temporarily stores data only for so long as power is applied during execution of programs.

In one example, a user operating a client computing device 36 may send a query 35 to the computing device 11. As described further with reference to FIG. 3, the query 35 includes text data. The processor 12 of the computing device 11 is configured to receive the query 35 from the user and execute the program 32 to determine a jurisdiction prediction list predicting what jurisdictions are mentioned in an input text. The processor 12 then returns a response 37 (query results) to the query 35 based on the determination that was made by the program 32, the response 37 containing a jurisdiction prediction list that is a result of the determination that was made by the rules-based named entity recognition module 24, the context-bound hypotheses algorithm 26, the type recognition module 28, and the named entity recognition filter 30.

The client computing device 36 may execute an application client 32A to send a query 35 to the computing device 11 upon detecting a user input 38, and subsequently receive the query results 37 from the computing device 11. The application client 32A may be coupled to a graphical user interface 34 of the client computing device 36 to display a graphical output 40 of the received query results 37.

Figure 2:
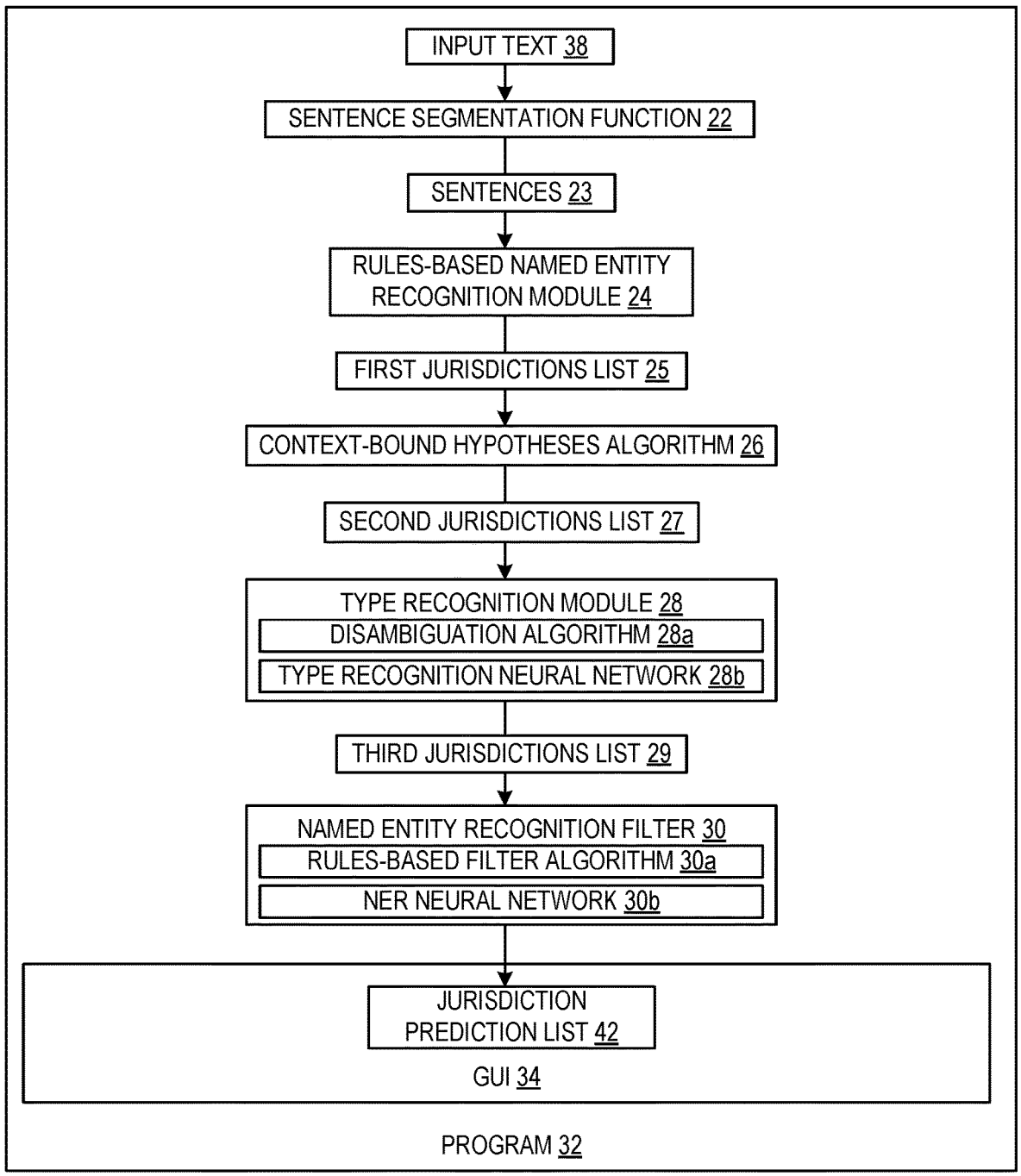
FIG. 2 illustrates a detailed schematic view of the program of the computing system of FIG. 1.

Referring to FIG. 2, a view of the program 32 including the sentence segmentation function 22, the rules-based named entity recognition module 24, the context-bound hypotheses algorithm 26, the type recognition module 28 including the disambiguation algorithm 28a and the type recognition neural network 28b, and the named entity recognition filter 30 including the rules-based filter algorithm 30a and the named entity recognition neural network 30b is depicted. The input text 38, which may include articles and other text data from various publications including legal databases, journals, papers, treatises, books, and guides, is processed by the sentence segmentation function 22, which divides the input text 38 into sentences 23 by detecting sentence boundaries. A rules-based named entity recognition module 24 receives input of the sentences 23, and applies unsupervised jurisdiction recognition to identify one or a plurality of jurisdiction candidates in the sentences 23 from a predetermined taxonomy, and generate and output a first jurisdictions list 25 comprising the one or a plurality of jurisdiction candidates. Additionally, a context-bound hypotheses algorithm 26 receives input of the first jurisdictions list 25 and performs initial toponym resolution, so that different jurisdictions with the same names may be disambiguated or resolved in the first jurisdictions list 25. The geographic scope of the documents may be estimated and the connections between nearby place names leveraged as evidence to resolve the toponyms. Main divisions may be mapped to the jurisdictions in the first jurisdictions list 25. A second jurisdictions list 27 of candidate fine-grained jurisdictions, mapped to main divisions, is subsequently generated and outputted by the context-bound hypotheses algorithm 26.

The type recognition module 28, which includes the disambiguation algorithm 28a and the type recognition neural network 28b, receives input of the second jurisdictions list 27 to perform type recognition, transforms the second jurisdictions list 27, and subsequently generates and outputs the third jurisdictions list 29. The type recognition module 28 executes the disambiguation algorithm 28a in conjunction with the type recognition neural network 28b to perform some additional disambiguation on the second jurisdictions list 27, especially in cases where the jurisdictions have the same name (for example, York City and York County). Thus, heuristic assumption may be made by the type recognition module 28 that one jurisdiction name is a city name, and the other jurisdiction name is a county name. Accordingly, the disambiguation algorithm 28a and the type recognition neural network 28b are used to further disambiguate jurisdictions with the same names in the second jurisdictions list 27, to generate and output the third jurisdictions list 29.

The type recognition neural network 28b is a transformer trained on a labeled ground truth dataset to classify spans (determine jurisdiction type), and focal loss is used for dealing with class imbalance.

The labeled ground truth dataset consists of texts with labeled jurisdiction entities. Jurisdiction labels indicating tax jurisdiction types are assigned to occurrences of jurisdictions in the text. For example, the jurisdiction label of 'state' is assigned to an occurrence of 'New Jersey' in the text, and the jurisdiction label of 'city' is assigned to an occurrence of 'Miami' in the text. In the labeled ground truth dataset, each ground truth jurisdiction text span is mapped to a jurisdiction type according to a predetermined taxonomy.

Accordingly, the type recognition neural network 28b is configured to handle two types of tokens: jurisdictions and tax jurisdiction types. The jurisdictions may include geographic names, for example. At inference time, those fine-grained jurisdiction candidate spans which have an ambiguous type (the type that cannot be unequivocally identified just based on the main division) are passed as inputs to the type recognition neural network 28b, sentence by sentence. The type recognition neural network 28b may be a LUKE (Language Understanding with Knowledge-based Embeddings) transformer model which treats not only words, but also entities as independent tokens, and computes intermediate and output representations for all tokens using the transformer. The LUKE model includes an entity-aware self-attention mechanism which considers the types of the tokens (words or entities) when computing attention scores for classifications.

The LUKE model is trained to recognize the jurisdiction type based on the provided input sentence and detected jurisdiction candidate spans. Jurisdiction type labels for the detected jurisdiction candidate spans are retrieved based on the candidate-ground truth jurisdiction span offset-based matching. For example, if a candidate jurisdiction span is a 'false positive', then the jurisdiction type label of 'not a jurisdiction' is assigned to the candidate jurisdiction span.

To reduce the number of false positive fine-grained jurisdiction candidates in the list, a rules-based named entity recognition filter 30 receives input of the third jurisdictions list 29, and uses a rules-based filter algorithm 30a and a named entity recognition neural network 30b to filter out names in the third jurisdictions list 29 that are actually not jurisdiction names. For example, the named entity recognition neural network 30b may assign labels to contiguous spans of tokens in the second jurisdictions list 27. The labels may include labels for organizations (e.g., companies, agencies, or institutions) and labels for geopolitical entities (e.g., countries, cities, or states). The rules-based filter algorithm 30a may execute a key rule requiring a country to be explicitly mentioned, a key rule requiring a label for organizations (e.g., companies, agencies, or institutions) or a label for geopolitical entities (e.g., countries, cities, or states), and/or a key rule requiring all fine-grained jurisdiction candidates from article headlines, not recognized as named entities by the named entity recognition neural network 30b, be filtered out. The named entity recognition filter 30 subsequently filters the third jurisdictions list 29 to generate and output the jurisdiction prediction list 42, which may be displayed on the graphical user interface 34. In other words, the rules-based filter algorithm 30a and the named entity recognition neural network 30b are used to further reduce redundancies in the third jurisdictions list 29, to generate and output the jurisdiction prediction list 42, which is subsequently displayed on the graphical user interface 34.

Figure 3:
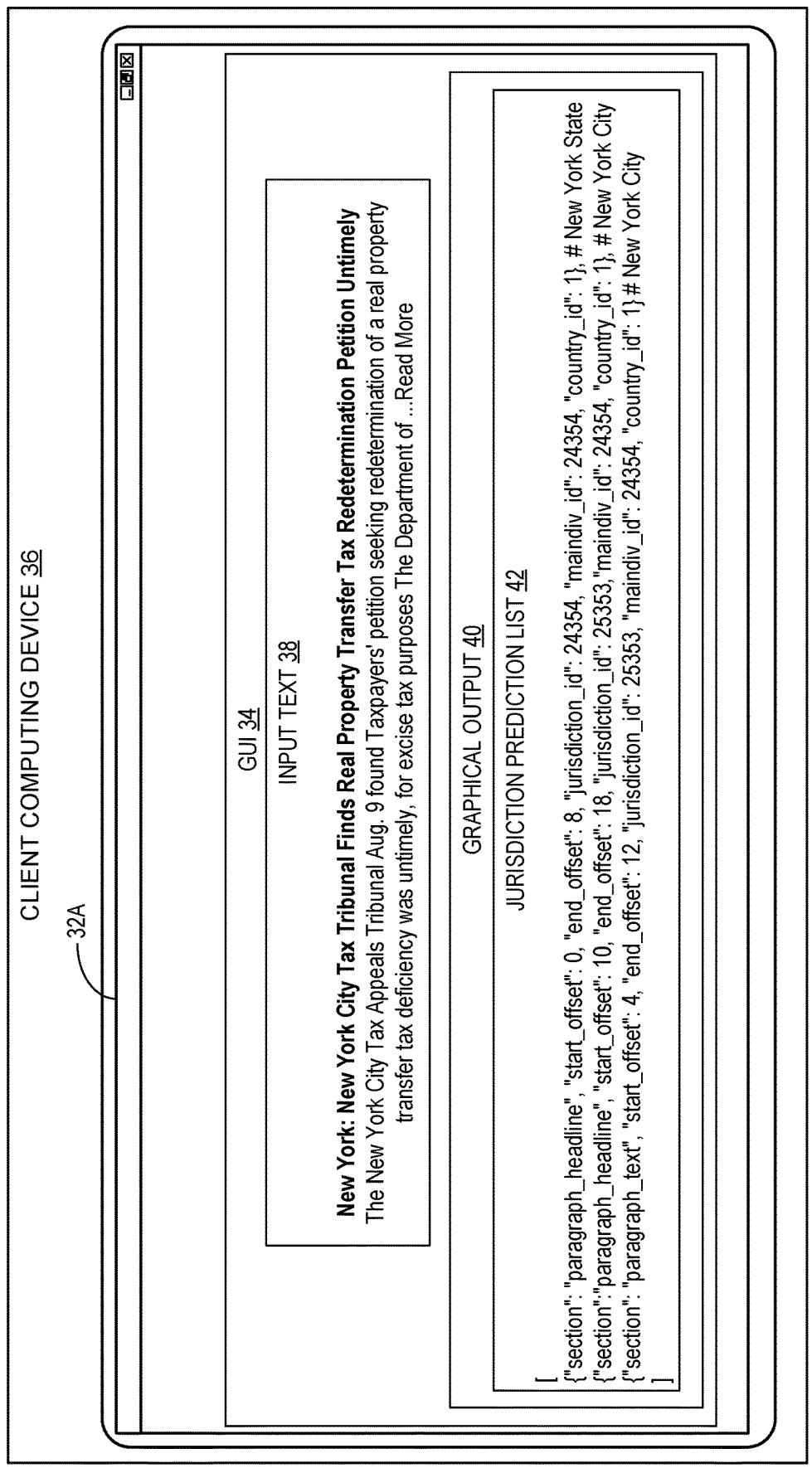
FIG. 3 illustrates one example of an input text and graphical output of the program of FIGS. 1 and 2.

FIG. 3 shows a schematic view of a program 32A, in which an input text 38 is inputted into a graphical user interface 34, and in response a jurisdiction prediction list 42 corresponding to the input text 38 is outputted on the graphical user interface 34. In this example, the input text 38 relates to a property tax in New York City. The program 32A divides this input text 38 into sentences and processes the sentences to generate and output the jurisdiction prediction list 42, which may be in a JSON format as shown in FIG. 3. In this example, the input text 38 is classified as corresponding to the jurisdictions of New York State and New York City.

Although the above example relates to tax law research, it will be appreciated that the program 32 may be alternatively adapted to be used in other situations where a user may classify a set of input text 38 into different jurisdiction classifications. Notably, the use of multiple layers of processing and filtering by rules-based filter algorithms and neural networks increases the accuracy of the classification of sentences into appropriate jurisdictions, especially using the type recognition neural network trained on a labeled ground truth dataset to classify spans (determine jurisdiction type), and using focal loss for dealing with class imbalance.

Figure 4:
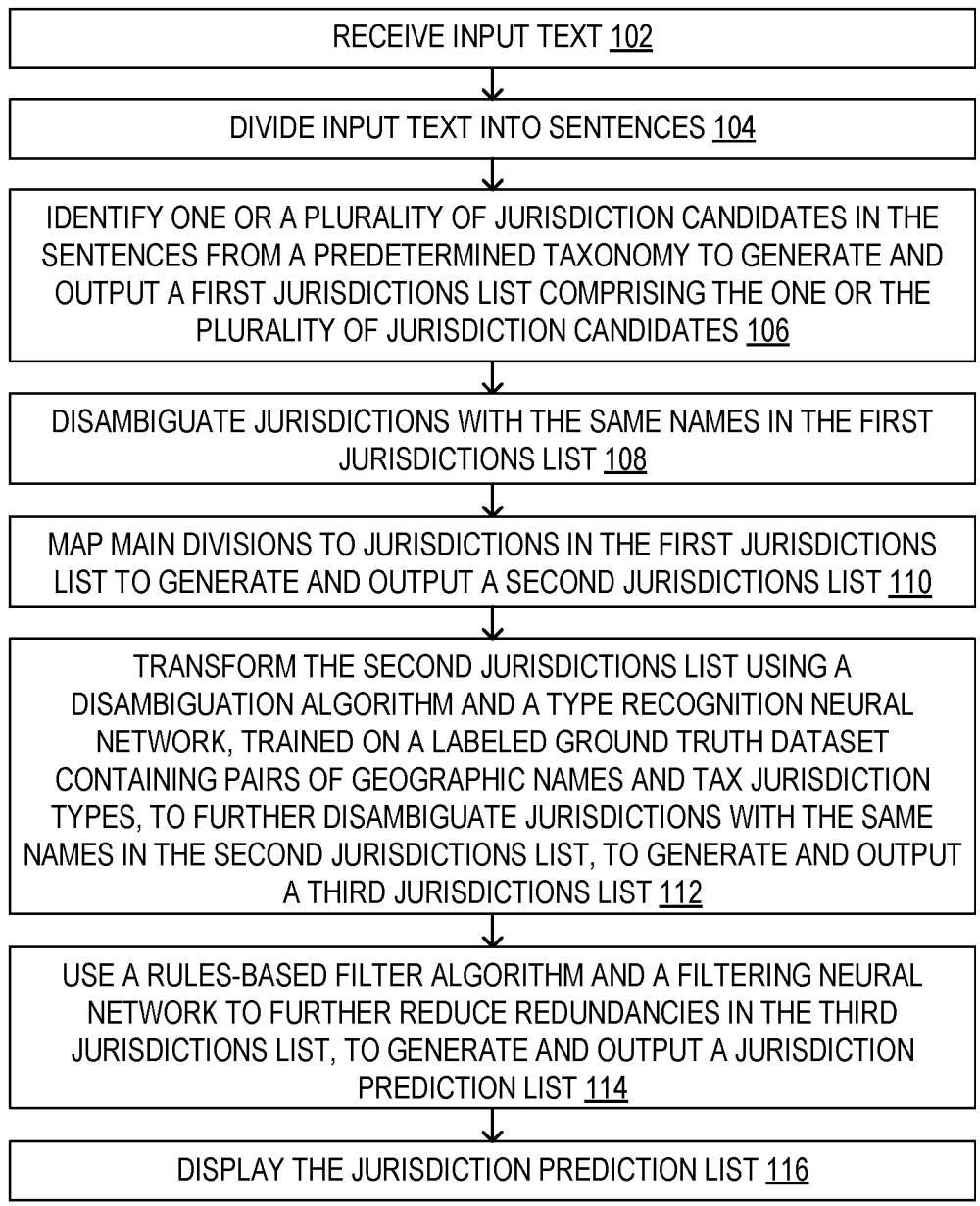
FIG. 4 is a flowchart of a method for generating and outputting a jurisdiction prediction list for an input text according to an example embodiment of the present disclosure.

FIG. 4 illustrates a flowchart of a computerized method 100 for generating and outputting a jurisdiction prediction list corresponding to an input text. The following description of computerized method 100 is provided with reference to the software and hardware components described above and shown in FIGS. 1 to 3. It will be appreciated that computerized method 100 also may be performed in other contexts using other suitable hardware and software components.

At step 102, input text is received. At step 104, the input text is divided into sentences. At step 106, one or a plurality of jurisdiction candidates are identified in the sentences from a predetermined taxonomy to generate and output a first jurisdictions list comprising the one or the plurality of jurisdiction candidates. At step 108, jurisdictions with the same names are disambiguated in the first jurisdictions list. At step 110, main divisions are mapped to jurisdictions in the first jurisdictions list to generate and output a second jurisdictions list. At step 112, the second jurisdictions list is transformed using a disambiguation algorithm and a type recognition neural network to further disambiguate jurisdictions with the same names in the second jurisdictions list, to generate and output a third jurisdictions list. The type recognition neural network is trained on a labeled ground truth dataset containing pairs of geographic names and tax jurisdiction types, such that the type recognition neural network is configured to handle two types of tokens: geographic names and tax jurisdiction types. At step 114, a rules-based filter algorithm and a named entity recognition neural network are used to further reduce redundancies in the third jurisdictions list, to generate and output a jurisdiction prediction list. At step 116, the jurisdiction prediction list is displayed on a graphical user interface.

The above-described system and method are provided for tax researchers to accurately identify jurisdiction names on tax law articles. This may help tax researchers save time spent on analyzing tax law articles.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
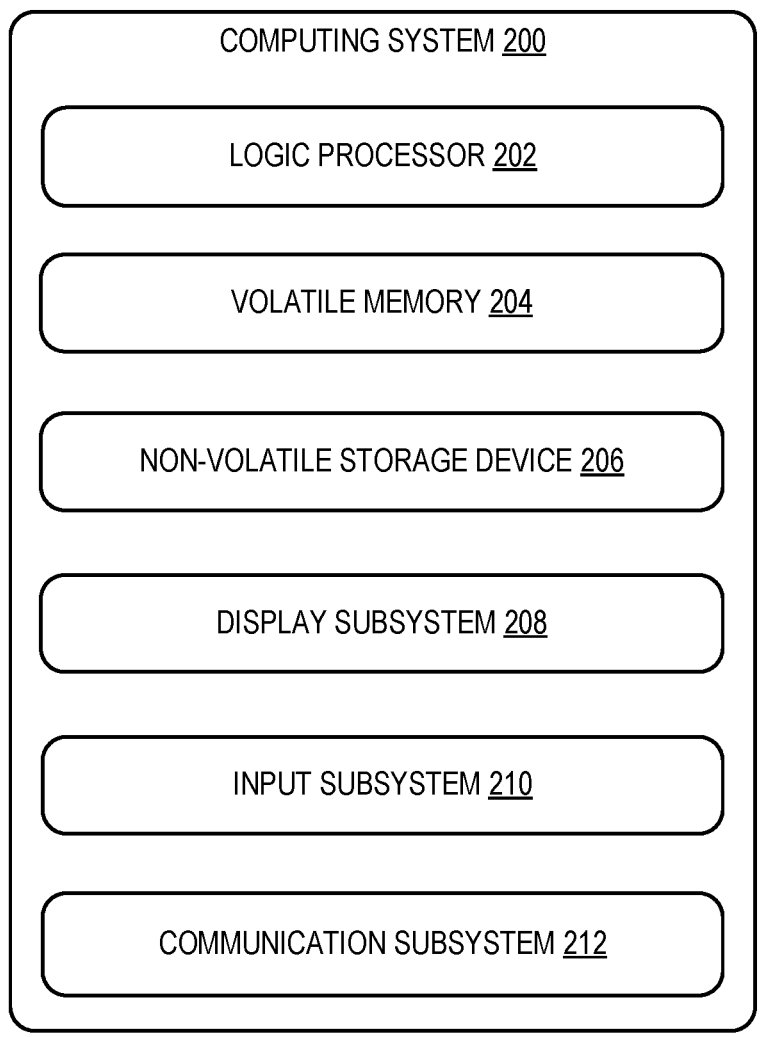
FIG. 5 shows an example computing environment of the present disclosure.

FIG. 5 schematically shows a non-limiting embodiment of a computing system 200 that can enact one or more of the methods and processes described above. Computing system 200 is shown in simplified form. Computing system 200 may embody the computing device 11 and the client computing device 36 described above and illustrated in FIGS. 1-3, respectively. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 5.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a microphone, camera, keyboard, mouse, or touch screen. The microphone may be configured to supply input to a speech recognition module.

When included, communication subsystem 212 may be configured to communicatively couple various computing devices described herein with each other, and with other devices. Communication subsystem 212 may include wired and/or wireless communication devices compatible with one or more different communication protocols. In some embodiments, the communication subsystem may allow computing system 200 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

It will be appreciated that "and/or" as used herein refers to the logical disjunction operation, and thus A and/or B has the following truth table.

| A | B | A and/or B |
|---|---|------------|
| T | T | T |
| T | F | T |
| F | T | T |
| F | F | F |

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system, comprising:
a processor and memory of a computing device, the processor being configured to execute a program using portions of memory to:
receive input text;
divide the input text into sentences;
identify one or a plurality of jurisdiction candidates in the sentences from a predetermined taxonomy to generate a jurisdictions list;
transform the jurisdictions list using a type recognition neural network to disambiguate jurisdictions in the jurisdictions list, the type recognition neural network being trained on a labeled ground truth dataset containing pairs of geographic names and tax jurisdiction types; and
generate and output the jurisdictions list as a jurisdiction prediction list.

2. The computing system of claim 1, wherein the type recognition neural network includes an entity-aware self-attention mechanism.

3. The computing system of claim 2, wherein the type recognition neural network is a transformer model.

4. The computing system of claim 3, wherein the transformer model is a LUKE (Language Understanding with Knowledge-based Embeddings) transformer model.

5. The computing system of claim 1, wherein labels are assigned to contiguous spans of tokens in the sentences using a named entity recognition neural network.

6. The computing system of claim 5, wherein the labels include labels for organizations and labels for geopolitical entities.

7. The computing system of claim 5, wherein the labels are filtered out in accordance with a rules-based filter algorithm.

8. The computing system of claim 7, wherein the rules-based filter algorithm includes a rule that jurisdiction candidates in the labels not recognized as named entities by the named entity recognition neural network be filtered out.

9. The computing system of claim 7, wherein the rules-based filter algorithm includes a rule requiring that the labels be labels for organizations or labels for geopolitical entities.

10. The computing system of claim 1, wherein geographic scope is estimated and connections between nearby place names are used to resolve jurisdictions with the same names in the jurisdictions list.

11. A method comprising steps to:
receive input text;
divide the input text into sentences;
identify one or a plurality of jurisdiction candidates in the sentences from a predetermined taxonomy to generate a jurisdictions list;
transform the jurisdictions list using a type recognition neural network to disambiguate jurisdictions in the jurisdictions list, the type recognition neural network being trained on a labeled ground truth dataset containing pairs of geographic names and tax jurisdiction types; and
generate and output the jurisdictions list as a jurisdiction prediction list.

12. The method of claim 11, wherein the type recognition neural network includes an entity-aware self-attention mechanism.

13. The method of claim 12, wherein the type recognition neural network is a LUKE (Language Understanding with Knowledge-based Embeddings) transformer model.

14. The method of claim 11, wherein labels are assigned to contiguous spans of tokens in the sentences using a named entity recognition neural network.

15. The method of claim 14, wherein the labels include labels for organizations and labels for geopolitical entities.

16. The method of claim 14, wherein the labels are filtered out in accordance with a rules-based filter algorithm.

17. The method of claim 16, wherein the rules-based filter algorithm includes a rule that jurisdiction candidates in the labels not recognized as named entities by the named entity recognition neural network be filtered out.

18. The method of claim 16, wherein the rules-based filter algorithm includes a rule requiring that the labels be labels for organizations or labels for geopolitical entities.

19. The method of claim 11, wherein geographic scope is estimated and connections between nearby place names are used to resolve jurisdictions with the same names in the jurisdictions list.

20. A computing system for generating a tax jurisdictions list for a tax law article, comprising:
a processor and memory of a computing device, the processor being configured to execute a program using portions of memory to:
receive input text of the tax law article;
identify one or a plurality of tax jurisdiction candidates in sentences of the tax law article from a predetermined tax jurisdictions taxonomy to generate the tax jurisdictions list;
transform the tax jurisdictions list using a transformer model to disambiguate jurisdictions in the tax jurisdictions list, the transformer model being trained on a labeled ground truth dataset containing pairs of geographic names and tax jurisdiction types; and
generate and output the tax jurisdictions list as a jurisdiction prediction list.

* * * * *